US012729837B1

(12) United States Patent
Wu

(10) Patent No.: US 12,729,837 B1
(45) Date of Patent: Sep. 8, 2026

(54) INTEGRATED TILT-ORIENTED LED LIGHT SOURCE MODULE

(71) Applicants: HUIZHOU HANXING OPTOELECTRONICS TECHNOLOGY CO., LTD., Huizhou (CN); Hongge Wu, Qingzhou (CN); LEDTURE INC., San Bernardino, CA (US)

(72) Inventor: Hongge Wu, Qinzhou (CN)

(73) Assignees: HUIZHOU HANXING OPTOELECTRONICS TECHNOLOGY CO., LTD., Huizhou (CN); Hongge Wu, Qinzhou (CN); LEDTURE INC., San Bernardino, CA (US)

( * ) Notice: Subject to any disclaimer, the term of this patent is extended or adjusted under 35 U.S.C. 154(b) by 0 days.

(21) Appl. No.: 19/369,557

(22) Filed: Oct. 27, 2025

(30) Foreign Application Priority Data

Apr. 30, 2025 (CN) ......................... 202510568725.9

(51) Int. Cl.

| | |
|---|---|
| ***F21V 17/06*** | (2006.01) |
| ***F21V 3/04*** | (2018.01) |
| ***F21V 23/06*** | (2006.01) |
| ***F21V 29/71*** | (2015.01) |
| ***F21V 29/74*** | (2015.01) |

(Continued)

(52) U.S. Cl.

CPC .............. *F21V 17/06* (2013.01); *F21V 3/049* (2013.01); *F21V 23/06* (2013.01); *F21V 29/713* (2015.01); *F21V 29/745* (2015.01); *F21Y 2105/16* (2016.08); *F21Y 2115/10* (2016.08)

(58) Field of Classification Search

CPC ..... F21S 41/285; F21S 43/2627; F21V 17/06; F21V 29/713; F21V 29/745; F21V 3/049; F21V 23/06

See application file for complete search history.

(56) References Cited

U.S. PATENT DOCUMENTS

| | | | | |
|---|---|---|---|---|
| 8,322,881 | B1 * | 12/2012 | Wassel .................. | H05B 45/10 362/217.05 |
| 9,699,854 | B2 * | 7/2017 | Wassel ...................... | F21V 7/28 |

(Continued)

*Primary Examiner* — Leah Macchiarolo

(74) *Attorney, Agent, or Firm* — Ming Jiang; OPENPTO US LLC

(57) ABSTRACT

An integrated tilt-oriented LED light source module is disclosed. The module includes a thermally conductive substrate having a mounting reference surface on which a number of tilted mounting platforms are arranged in parallel, with a mounting surface of each platform forming a preset tilt angle with the reference surface. A substrate assembly, including a number of aluminum substrates and flexible conductive connectors, is fixed to the mounting platforms. A light source assembly comprising a number of light-emitting devices is mounted on the aluminum substrates. A multi-faceted cover plate has an inner surface conforming to the profile of the substrate and substrate assembly, with lenses formed thereon. A fastening assembly encloses and secures the components. The module achieves a unified beam projection direction from the factory via the preset tilt angles of the mounting platforms, eliminating the need for exposed adjustable structures and ensuring a smooth and simple luminaire appearance.

10 Claims, 9 Drawing Sheets

(51) Int. Cl.
*F21Y 105/16* (2016.01)
*F21Y 115/10* (2016.01)

(56) References Cited

U.S. PATENT DOCUMENTS

| | | | | |
|---|---|---|---|---|
| 2011/0149566 | A1* | 6/2011 | Lin | F21S 8/086<br>362/235 |
| 2011/0222284 | A1* | 9/2011 | Kong | F21V 29/83<br>362/249.02 |
| 2014/0029259 | A1* | 1/2014 | Auyeung | G09F 13/02<br>362/249.02 |
| 2015/0103539 | A1* | 4/2015 | Lee | F21S 45/47<br>29/525.08 |
| 2017/0045190 | A1* | 2/2017 | Song | F21S 41/192 |

* cited by examiner

INTEGRATED TILT-ORIENTED LED LIGHT SOURCE MODULE

TECHNICAL FIELD

The present disclosure relates to field of LED lighting technology, and more particularly, to an integrated tilt-oriented LED light source module.

BACKGROUND

In public lighting projects, particularly for facilities such as municipal streetlights and landscape courtyard lights, regional installation standards often impose stringent requirements on the overall appearance and mounting methods of the luminaires to ensure the safety and aesthetics of municipal facilities.

Conventional LED luminaires often use a planar substrate to mount the light source, resulting in a diffuse light distribution that makes precise directional illumination difficult to achieve. For public lighting areas (e.g., sports fields, roadways), when conventional luminaires installed at the edge of an area require precise directional lighting, mechanical structures such as hinges or rotating arms are typically added to the back or side of the luminaire body. The illumination direction is changed by manually adjusting the angle of the lamp head. While this method can achieve directional lighting, its appearance is non-compliant: the exposed adjustment mechanisms disrupt the streamlined design of the luminaire body and are prone to dust accumulation and corrosion, failing to meet the strict installation regulations in some regions. Furthermore, frequent adjustments can lead to loosening at the hinged joints, which may cause the lamp head to wobble or even detach in high-wind conditions, posing a safety hazard.

SUMMARY

To address the shortcomings and deficiencies of the prior art, the present invention aims to provide an integrated tilt-oriented LED light source module, which avoids the irreconcilable contradiction between the existing "requirement for directional lighting functionality" and the "mandatory installation standards demanding non-adjustable lamp bodies and appearance integrity."

The specific technical solution of the present invention is as follows:

An integrated tilt-oriented LED light source module of a present disclosure is provided, comprising:

- a thermally conductive substrate having a mounting reference surface, wherein a plurality of tilted mounting platforms are arranged in parallel on the mounting reference surface, and a mounting surface of each tilted mounting platform forms a preset tilt angle with the mounting reference surface, and the mounting surfaces of the tilted mounting platforms have a same tilt direction with a same tilt angle value;
- a substrate assembly, comprising a plurality of aluminum substrates and a flexible conductive connector, wherein each of the aluminum substrates is fixed to the mounting surface of a corresponding one of the tilted mounting platforms, and the flexible conductive connector bridges adjacent ones of the plurality of aluminum substrates to form a conductive path;
- a light source assembly, comprising a plurality of light-emitting devices mounted on the plurality of aluminum substrates;
- a multi-faceted cover plate, having an inner surface profile that conforms to an outer peripheral profile of the thermally conductive substrate and the substrate assembly in an assembled state thereof, wherein a lens is integrally formed via precision injection molding process corresponding to a light-emitting surface of each light-emitting device; and
- a fastening assembly, enclosing an outer periphery of the thermally conductive substrate and the multi-faceted cover plate and securing the thermally conductive substrate and the multi-faceted cover plate together.

In some preferred technical solutions, the tilted mounting platforms are wedge-shaped block structures arranged in parallel along a length direction, a width direction, or a diagonal direction of the mounting reference surface, wherein an inclined face of each wedge-shaped block structure constitutes the mounting surface; and the light-emitting devices are arranged in a matrix array on each of the aluminum substrates, and the flexible conductive connector is positioned to avoid the plurality of light-emitting devices.

In a preferred technical solution, the tilted mounting platforms are integrally cast on the mounting reference surface.

Or, in another preferred technical solution, the mounting reference surface of the thermally conductive substrate is provided with a connection screw hole; and the tilted mounting platform is a separate body having a countersunk hole at a center of its surface and a coaxial threaded hole below the countersunk hole, and the connection screw hole and the threaded hole are engaged by a countersunk fastening screw with a head of the screw fully seated within the countersunk hole; and

- the mounting reference surface of the thermally conductive substrate is provided with a limiting groove, and a bottom of the tilted mounting platform is provided with a limiting block configured to mate with the limiting groove.

In a preferred technical solution, the flexible conductive connector is a strip-like flexible printed circuit, the flexible printed circuit extends along an arrangement direction of the plurality of tilted mounting platforms and is integrally formed with a plurality of independent bent portions; a bending angle of each of the independent bent portions matches a tilt angle of the mounting surface of the corresponding tilted mounting platform, and a bending apex of each bent portion is located at a high-side edge of the corresponding tilted mounting platform; and the independent bent portions of the flexible printed circuit are laminated onto an upper surface of each of the aluminum substrates with a conductive adhesive to form a continuous surface-contact conductive path covering all of the aluminum substrates.

Furthermore, the tilted mounting platforms are arranged in parallel and spaced apart on the mounting reference surface, and a straight section of the flexible printed circuit between adjacent independent bent portions covers the mounting reference surface between adjacent tilted mounting platforms;

- the aluminum substrate fixed to the tilted mounting platform has a recess at its high-side edge to accommodate the bending apex of the corresponding independent bent portion; and
- the aluminum substrate is fastened to the mounting surface of the tilted mounting platform at two ends of its body by screw fasteners, wherein installation positions of the screw fasteners avoid the recess and the flexible printed circuit.

In a preferred technical solution, the tilted mounting platforms includes an outermost tilted mounting platform located at one end of the mounting reference surface, and a mounting surface of the outermost tilted mounting platform faces an inner side of the mounting reference surface; and the thermally conductive substrate is provided with a wire-through hole on a side outward of the outermost tilted mounting platform and a receiving groove on a surface inward of the outermost tilted mounting platform; and the aluminum substrate fixed to the outermost tilted mounting platform has an extension portion extending from a low-side of its inclined face toward the receiving groove;

a high-side edge of the outermost tilted mounting platform is provided with an arc-shaped groove connected to the recess of the aluminum substrate, wherein an input line passes through the wire-through hole, is covered by an insulating sleeve, and is bent to pass through the arc-shaped groove and the recess, extending along the inclined face of the aluminum substrate to the receiving groove area; and an end of the input line is connected to a terminal and a TVS diode in sequence, wherein the TVS diode is welded to an upper surface of the extension portion of the aluminum substrate and is electrically connected to the aluminum substrate.

In a preferred technical solution, the multi-faceted cover plate is an integrally injection-molded structure, comprising:

a main cover body, covering the outer peripheral profile of the thermally conductive substrate and the substrate assembly in the assembled state;

a plurality of protrusions, integrally formed on the main cover body along an arrangement direction of the tilted mounting platforms, wherein a shape of each of the plurality of protrusions is adapted to a combined outer peripheral profile of the corresponding tilted mounting platform and aluminum substrate, and wherein a profile of each protrusion at a high-side of the corresponding tilted mounting platform has an arc-shaped transition structure; and a plurality of the lenses, wherein each lens corresponds to a position of one of the light-emitting devices and is integrally formed on the corresponding protrusion, such that the light-emitting surface of each light-emitting device faces a center of one lens.

In a preferred technical solution, the thermally conductive substrate is a rectangular plate-like structure and constitutes a first heat dissipation plate, two sides of the first heat dissipation plate on a surface opposite the mounting reference surface extend symmetrically away from the module to form two second heat dissipation plates, and ends of the two second heat dissipation plates are connected by a third heat dissipation plate, thereby forming a flow channel with a quadrilateral cross-section and openings on two sides; and a plurality of heat dissipation cut-grooves are milled from an outer surface of the third heat dissipation plate toward the first heat dissipation plate, wherein the heat dissipation cut-grooves extend into the two second heat dissipation plates along their extension direction but do not extend to a junction between the second heat dissipation plates and the first heat dissipation plate.

In another preferred technical solution, the quadrilateral cross-section is an isosceles trapezoid, the two second heat dissipation plates are two legs of the isosceles trapezoid, and the third heat dissipation plate is a shorter base of the isosceles trapezoid, and the heat dissipation cut-grooves are straight grooves that traverse the third heat dissipation plate and partially cut into the second heat dissipation plates, and an extension direction of the straight grooves is perpendicular to a plane of the first heat dissipation plate; and on an outer surface of each of the two second heat dissipation plates, a plurality of strip-like heat dissipation fins are arranged in sequence, parallel to a junction edge of the second heat dissipation plate and the first heat dissipation plate, in a direction from an end near the first heat dissipation plate to an end far from the first heat dissipation plate; wherein a height of each of the plurality of heat dissipation fins gradually increases along the arrangement sequence.

Based on the above inventive principles, the beneficial effects of the present disclosure are as follows:

The integrated tilt-oriented LED light source module of the present invention fixes the light source assembly on mounting platforms with preset tilt angles, enabling unified beam projection direction directly from the factory. This design avoids the need for externally exposed adjustable structures, ensuring a smooth and clean appearance of the lamp body. At the same time, all light-emitting devices share the same preset tilt angle, resulting in highly concentrated beam angles, effectively preventing light from being projected onto non-target areas (such as residential windows) and reducing complaints related to light pollution.

The light source module of the present invention integrates a multi-faceted cover plate that combines lens functionality with a sealing structure. This enables directional lighting with tilt control while maintaining a relatively thin lamp profile, featuring a simple structure and improved aesthetic appearance. The arc-shaped transitional structure on the protrusions allows uniform light diffusion and enhances central illuminance. In addition, the aluminum substrates of the light source module are directly connected to the thermally conductive base, forming an ultra-short thermal conduction path of "light source-aluminum substrate-thermally conductive base," which reduces thermal resistance.

The heat dissipation performance of the LED light source module of the present invention is significantly improved, with the cooling efficiency enhanced in the following aspects: heat-dissipating cut grooves are formed on the quadrilateral outer frame of the flow channel; the grooves pass through the third heat dissipation plate and partially extend into the second heat dissipation plate, forming localized thermal bridges perpendicular to the first heat dissipation plate. This shortens the heat transfer path from the first heat dissipation plate to the third heat dissipation plate and accelerates lateral heat diffusion. The grooves create segmented airflow channels within the third and second heat dissipation plates. During natural convection, as hot air rises, cool air is drawn in from the bottom of the grooves, creating a chimney effect that forces airflow circulation and breaks the stagnant thermal boundary layer.

DETAILED DESCRIPTION

An integrated tilt-oriented LED light source module provided by the present disclosure achieves directional, adjustment-free illumination by fixing aluminum substrates and light-emitting devices on tilted mounting platforms with a preset tilt angle. Its integrated multi-faceted cover plate merges lens functionality with a sealing structure, enhancing light efficiency while reducing thickness. This design precisely matches the compliance standards for installation in scenarios such as roadways and landscapes, comprehensively addressing the industry pain points of non-compliant directional adjustment and insufficient light efficiency in traditional solutions.

The following embodiments are provided to further illustrate the present invention, but should not be construed as limiting the scope thereof. Modifications or substitutions made without departing from the spirit and essence of the invention shall fall within the scope defined by the appended claims. The following description of the embodiments, with reference to the accompanying drawings, is provided to explain the present disclosure but should not be construed as limiting the invention.

Figure 1:
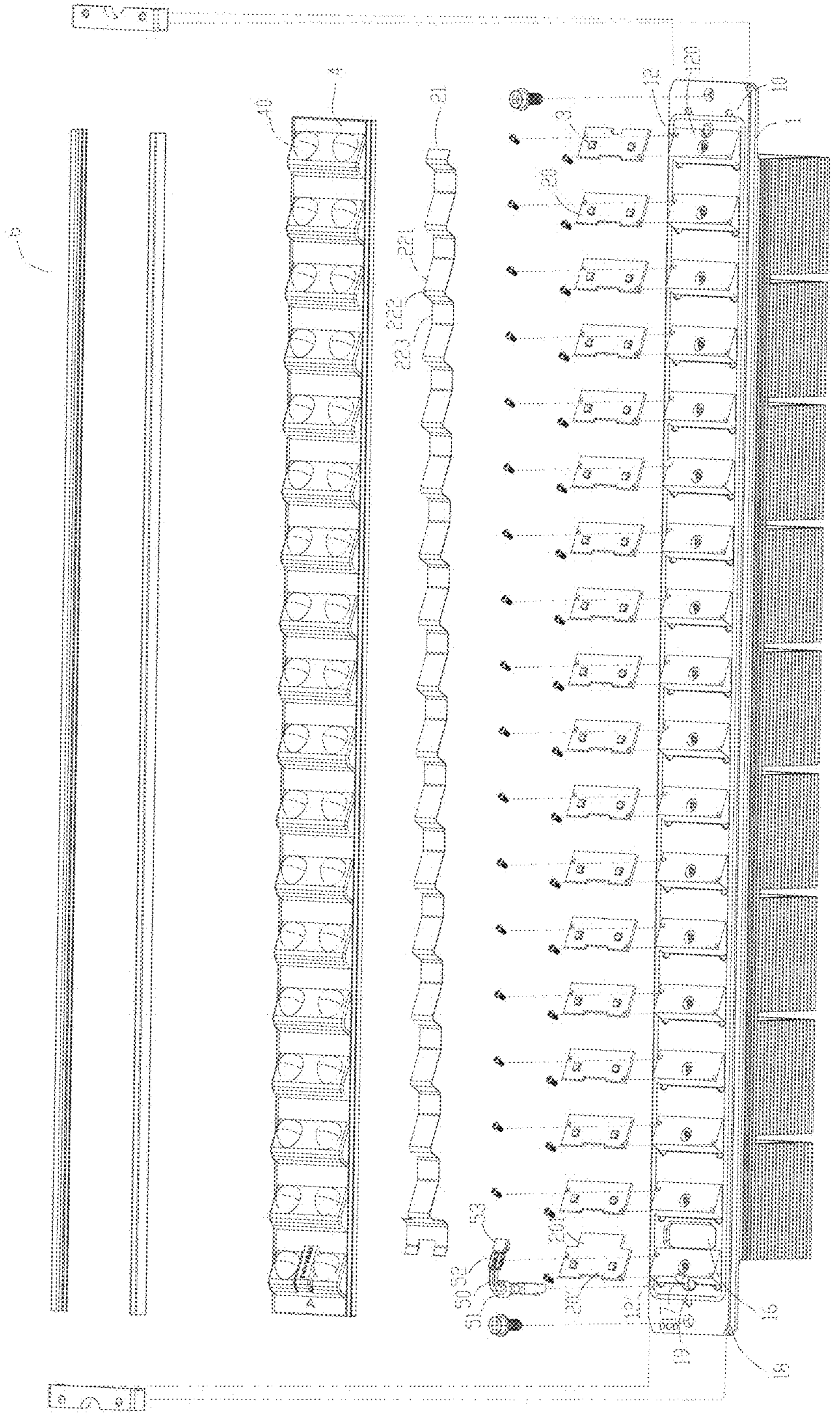
FIG. 1 is an exploded structural schematic view of an embodiment of the integrated tilt-oriented LED light source module according to the present disclosure.

As shown in FIG. 1, an embodiment of an integrated tilt-oriented LED light source module of the present disclosure comprises:

- a thermally conductive substrate 1 having a mounting reference surface 10, wherein a number of tilted mounting platforms 12 are arranged in parallel on the mounting reference surface 10, and a mounting surface 120 of each tilted mounting platform 12 forms a preset tilt angle with the mounting reference surface 10; and the mounting surfaces of the tilted mounting platforms 12 have a same tilt direction with an angle value;
- a substrate assembly, comprising a number of aluminum substrates 20 and a flexible conductive connector 21, wherein each aluminum substrate 20 is fixed to the mounting surface 120 of a corresponding tilted mounting platform 12, and the flexible conductive connector 21 bridges adjacent aluminum substrates 20 to form a conductive path;
- a light source assembly, comprising a number of light-emitting devices 3 mounted on the aluminum substrates 20;
- a multi-faceted cover plate 4, having an inner surface profile that conforms to the outer peripheral profile of the thermally conductive substrate 1 and the substrate assembly in an assembled state thereof, with a lens 40 formed corresponding to the light-emitting surface of each light-emitting device 3; and
- a fastening assembly 6 that encloses the outer periphery of the thermally conductive substrate 1 and the multi-faceted cover plate 4, securing them tightly together.

The primary function of the tilted mounting platform of the present disclosure is to provide a mounting surface with a preset tilt angle for fixing the aluminum substrate. If the core function of a consistent inclined surface is met, the tilted mounting platform may be selected from at least one of a wedge shape, a trapezoid shape, or a stepped shape. In an exemplary embodiment, the tilted mounting platform 12 is a wedge-shaped block structure, and its inclined face is the mounting surface for fixing the aluminum substrate and forming the preset tilt angle. A number of the wedge-shaped block structures are arranged in parallel along a length direction (e.g., longitudinal), a width direction (e.g., transverse), or a diagonal direction of the mounting reference surface 10, and the inclined face of each wedge-shaped block structure form the mounting surface 120. The arrangement direction of all tilted mounting platforms is the same, and their preset tilt angle values are also the same, such that the mounting surface of each tilted mounting platform is inclined toward the same target illumination area. The arrangement direction of the tilted mounting platforms on the mounting reference surface 10 may include a longitudinal, transverse, or diagonal direction. When the tilted mounting platforms are arranged longitudinally on the mounting reference surface 10, the overall form of the light source module can be shown in FIG. 11; when arranged transversely, the overall form can be shown in FIG. 1. The overall form of the light source module can be shown in FIGS. 10, and 12. The number of light-emitting devices 3 on each tilted mounting platform 12 is determined based on the length of the platform's surface. When the mounting platforms are arranged in parallel along a non-orthogonal direction (e.g., diagonally) of the mounting reference surface, the tilt angle value and tilt direction of the mounting surface of all platforms are identical. The light-emitting devices on each aluminum substrate are still arranged in a standard matrix (i.e., with orthogonal rows and columns). The light emission axis of all light-emitting devices is uniformly shifted according to the tilt of the mounting surface, thereby achieving an overall adjustment of the illumination direction. The light-emitting devices 3 are arranged in a matrix array on each aluminum substrate 20, and the flexible conductive connector 21 is positioned to avoid the light-emitting devices 3, thereby preventing obstruction of their light-emitting surfaces.

The connection between the tilted mounting platforms and the thermally conductive substrate can be achieved in one of two ways:

- Firstly, the tilted mounting platforms 12 can be integrally cast on the mounting reference surface.
- Secondly, the tilted mounting platforms 12 and the mounting reference surface of the thermally conductive substrate are fixedly connected by mechanical means. In one example, referring to FIG. 2 and FIG. 3, the mounting reference surface 10 of the thermally conductive substrate 1 is defined with a connection screw hole 11. The tilted mounting platform 12 is a separate body with a countersunk hole 121 at its surface center, and a coaxial threaded hole 122 is defined below the countersunk hole 121. The connection screw hole 11 and the threaded hole 122 are engaged by a countersunk fastening screw 123, with the head of the screw fully seated within the countersunk hole 121. The depth of the countersunk hole for the fastening screw 123 is slightly greater than the height of the screw head to ensure the fastening screw 123 is not exposed. The countersunk hole 121 can be located at any position on the tilted mounting platform 12; to ensure uniform and reasonable force distribution, the countersunk hole 121 is located at the center of the tilted mounting platform 12.

The mounting reference surface 10 of the thermally conductive substrate 1 is defined with a limiting groove 13, and the bottom of the tilted mounting platform 12 is provided with a limiting block 124. The limiting block 124 is used to mate with the limiting groove 13. The tilted mounting platform 12 is restricted from displacement in the horizontal direction along the mounting reference surface by the cooperation of the limiting block 124 and the limiting groove 13. It is further pressed down and fixed from above by the multi-faceted cover plate 4. That is, coarse positioning is achieved through the mechanical interlock of the limiting groove and the limiting block, and fine positioning is then completed by the conformal pressure fitting of the multi-faceted cover plate. This design ensures high-precision assembly while significantly enhancing structural reliability.

Figure 4:
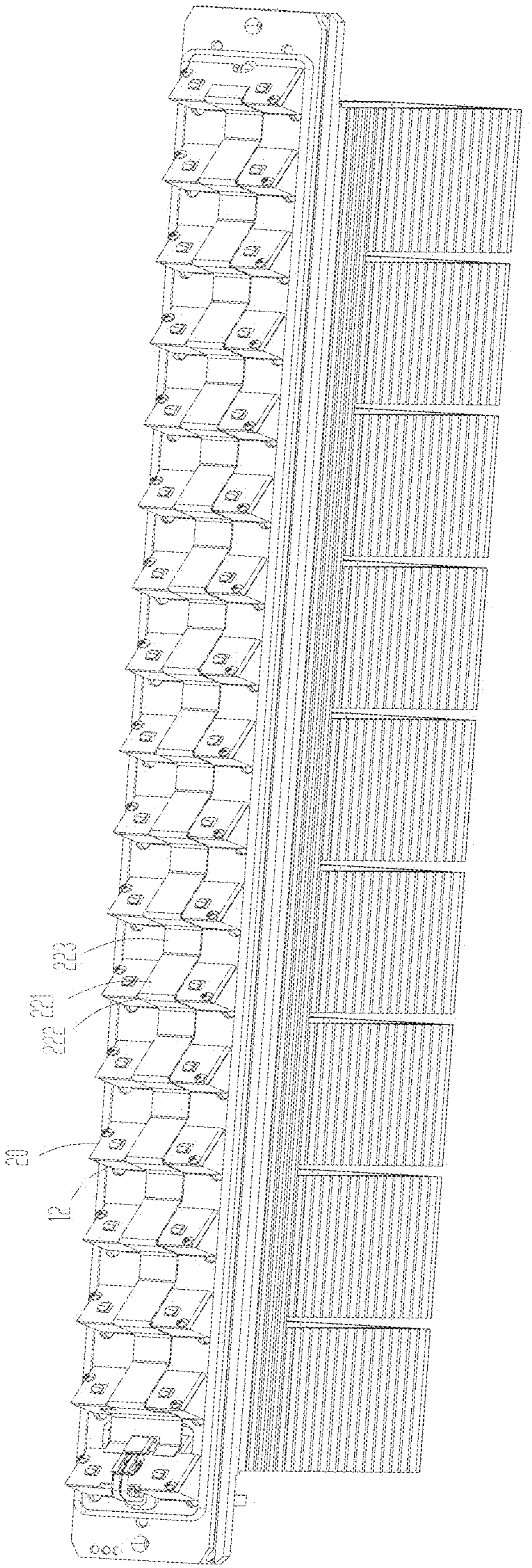
FIG. 4 is a schematic view of an embodiment showing the assembled state of a thermally conductive substrate, a tilted mounting platform, and a substrate assembly of the present disclosure.

The flexible conductive connector 21 is a flexible printed circuit (FPC). As a conductive connector, the FPC replaces traditional rigid circuit boards or wires and possesses bendability. The present disclosure achieves high-precision, high-reliability conductive path adaptation through a multi-segment bent design of the FPC and lamination with conductive adhesive. Specifically, the FPC is a strip-like structure. Referring to FIG. 1 and FIG. 4, the FPC extends along the arrangement direction of the tilted mounting platforms 12 and is integrally formed with multiple independent bent portions 221. The bending angle of each independent bent portion 221 matches the tilt angle of the mounting surface of the corresponding tilted mounting platform 12, and its bending apex 222 is located at the high-side edge of the corresponding tilted mounting platform 12. As used herein, the "high-side edge" refers to the relatively higher region of the mounting surface of the tilted mounting platform along the direction of the preset tilt angle; that is, when the mounting surface forms the preset tilt angle with the mounting reference surface, it is the edge or area of the mounting surface that is at a greater vertical height from the mounting reference surface. The bent form of the FPC is adapted to the outer peripheral profile of the mounting reference surface 10, the tilted mounting platforms 12, and the aluminum substrates 20 in their assembled state, ensuring the continuity of electrical connections and structural compatibility. The independent bent portions 221 of the FPC are laminated onto the upper surface of each aluminum substrate 20 with a conductive adhesive to form a continuous surface-contact conductive path covering all aluminum substrates 20, thereby improving conductive reliability and mechanical fixation.

In one example, referring to FIG. 4, the number of tilted mounting platforms 12 are arranged in parallel and spaced apart on the mounting reference surface. A straight section 223 of the FPC between adjacent independent bent portions 221 covers the mounting reference surface between the adjacent tilted mounting platforms 12.

Based on an understanding of the function of the FPC described above, the FPC can be processed into the aforementioned strip-like form with multiple continuous bends. It is laid along the arrangement direction of the tilted mounting platforms 12, with its path being a straight line in the same orthographic projection. Its specific placement is determined by the need to achieve its function. In a preferred example, referring to FIG. 4, the FPC is laid in the middle of the tilted mounting platforms 12 and avoids the light-emitting devices. The FPC can also be processed into multiple discontinuous bent strips, meaning the FPC is configured as multiple independent short segments laid along the arrangement direction of the tilted mounting platforms 12, with each short segment connecting to the adjacent aluminum substrates 20 end-to-end to complete the circuit.

The aluminum substrate 20 fixed on the tilted mounting platform 12 has a recess 15 on its high-side edge to accommodate the bending apex 222 of the corresponding independent bent portion 221. The sidewall of the recess 15 supports the FPC, reducing stress concentration at the bend.

In one example, the aluminum substrate 20 is used to dissipate heat and support the light-emitting devices, and its thickness is 1-3 mm to ensure mechanical strength while providing good heat dissipation performance. The total thickness of the FPC is 0.15-0.3 mm to ensure flexibility and current-carrying capacity.

Figure 2:
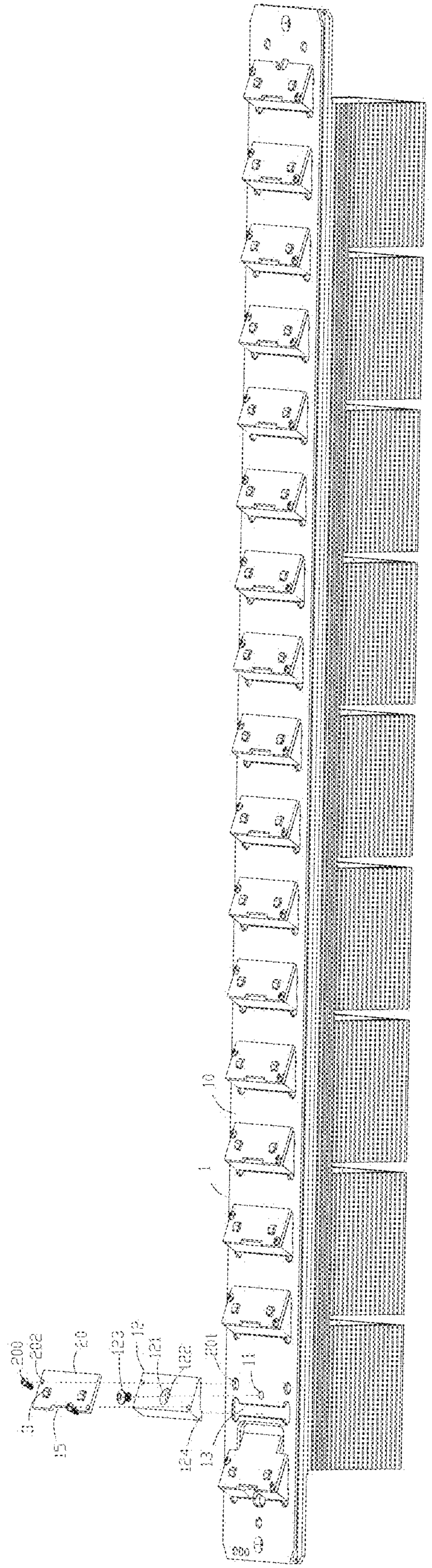
FIG. 2 is a schematic view of an embodiment showing the assembly relationship of a thermally conductive substrate, a tilted mounting platform, and an aluminum substrate of the present disclosure.
Figure 3:
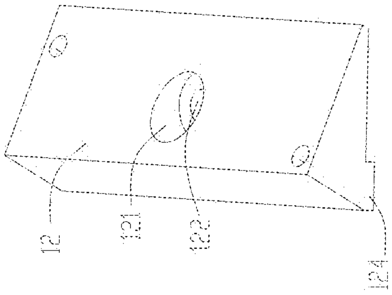
FIG. 3 is a schematic view of an embodiment of a tilted mounting platform of the present disclosure.

The aluminum substrate 20 is fastened to the mounting surface of the tilted mounting platform 12 at both ends of its body by screw fasteners, with the installation positions of the screw fasteners avoiding the recess 15 and the flexible conductive connector 21. Referring to FIG. 2, the aluminum substrate 20 is provided with screw holes 202 on both sides, and a uniform clamping force is applied to both sides of the aluminum substrate 20 by screws 200 to ensure tight contact between the aluminum substrate 20 and the mounting surface of the tilted mounting platform 12. The screws 200 used here are small-diameter self-locking screws, such as M2 or M3, to ensure they do not interfere with the cover plate while fulfilling their mechanical function. Since the aluminum substrate 20 has both light-emitting devices 3 and screws 200 distributed on it, to reasonably position all components, the two screws 200 can be placed on diagonal sides of the aluminum substrate to avoid competing for space with the light-emitting devices on the same axis. Because the tilted mounting platform 12 is thinner at its lower-inclined end, the screw 200 can easily pass through the tilted mounting platform 12 and press against the thermally conductive substrate 1 below. To ensure all layers are tightly connected, the upper surface of the thermally conductive substrate 1 is provided with a clearance hole 201 at the position corresponding to the insertion of the screw 200.

Referring to FIG. 1, the tilted mounting platforms 12 includes an outermost tilted mounting platform 12' located at one end of the mounting reference surface 10, with its mounting surface facing an inner side of the mounting reference surface 10. The thermally conductive substrate 1 has a wire-through hole 19 on the side outward of the outermost platform 12' and a receiving groove 16 on the surface inward of the platform. The wire-through hole 19 is located on the outer end face of the thermally conductive substrate 1 and is used for introducing a power/signal line (i.e., input line 50). The aluminum substrate 20' fixed to this outermost tilted mounting platform 12' has an extension portion 201 extending from the low-side of its inclined face toward the receiving groove 16, providing a mounting platform for a terminal.

A high-side edge of the outermost tilted mounting platform 12' is provided with an arc-shaped groove 17 that connects to the recess of the aluminum substrate 20'. The input line 50 passes through the wire-through hole 19, is covered by an insulating sleeve 51, and is sequentially bent through the arc-shaped groove 17 and the recess before connecting to a terminal 52. The terminal 52 extends along the inclined face of the aluminum substrate 20' from the low-side to the receiving groove 16 area, as shown in FIG. 4. An output end of the terminal 52 is connected to a TVS diode 53, which is fixed to an upper surface of the extension portion 201 by laser welding and is electrically connected to the aluminum substrate 20'. Simultaneously, one end of the flexible conductive connector 21 is connected to the surface of the aluminum substrate 20' on the outermost tilted mounting platform 12', forming a conductive path across the mounting platforms. This structure provides a fully concealed wiring path through the wire-through hole, arc-shaped groove, recess, and receiving groove, preventing exposed cables from affecting the aesthetics and light field distribution.

Figure 5:
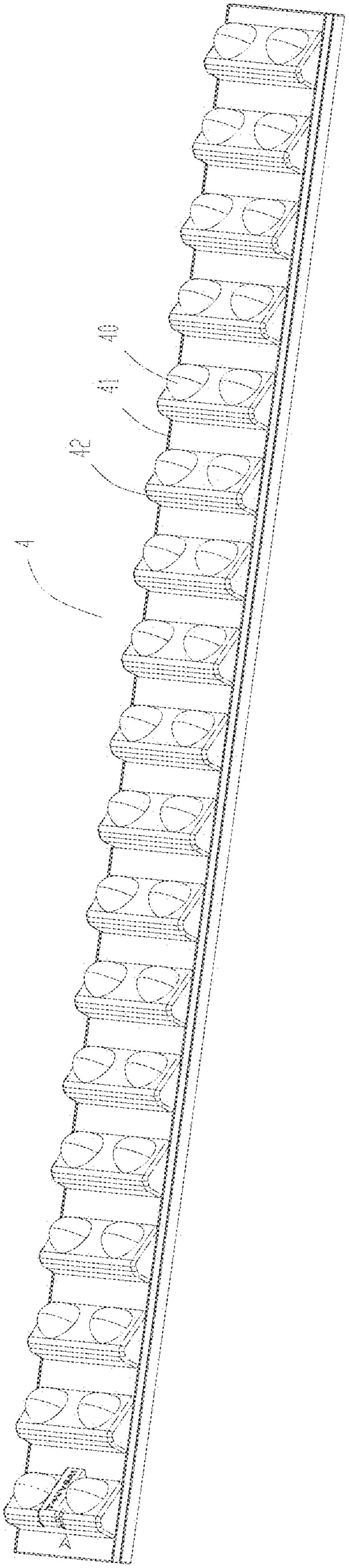
FIG. 5 is a schematic view of an embodiment of a multi-faceted cover plate of the present disclosure.

Referring to the embodiment in FIG. 5, the multi-faceted cover plate 4 is an integrally injection-molded structure, integrally formed via precision injection molding process. Its structure includes a main cover body 41, a number of protrusions 42, and a number of lens units.

The main cover body 41 covers the outer peripheral profile of the thermally conductive substrate 1 and the substrate assembly in their assembled state. It serves as a cover to protect the internal circuits and light-emitting devices, and also as a mounting base for the protrusions and lens units. Under the clamping force of the fastening assembly 6, the main cover body 41, except for the protrusions 42, conforms to the outer peripheral profile of the underlying thermally conductive substrate 1 and substrate assembly, ensuring that all components are securely positioned and do not move.

A number of protrusions 42 are integrally formed on the main cover body 41 along the arrangement direction of the tilted mounting platforms 12. The shape of each protrusion 42 is adapted to the combined outer peripheral profile of the corresponding tilted mounting platform 12 and aluminum substrate 20 to avoid assembly stress. Referring to FIG. 1, since the tilted mounting platforms 12 are wedge-shaped, the shape of the protrusions 42 is adapted to the wedge shape. The profile of the protrusion 42 at the high-side edge of the corresponding tilted mounting platform 12 has an arc-shaped transition structure. This arc-shaped surface guides stray light, creating a smooth transition between the light-emitting areas of adjacent light-emitting devices, which enhances both aesthetics and light intensity uniformity.

Among the number of lenses 40, each lens 40 corresponds to the position of a light-emitting device 3 and is integrally formed on the corresponding protrusion 42, such that the light-emitting surface of each light-emitting device 3 faces the center of one lens. The lenses 40 are customized according to the application scenario and may include convex lenses, Fresnel lenses, or micro-prism arrays.

Figure 6:
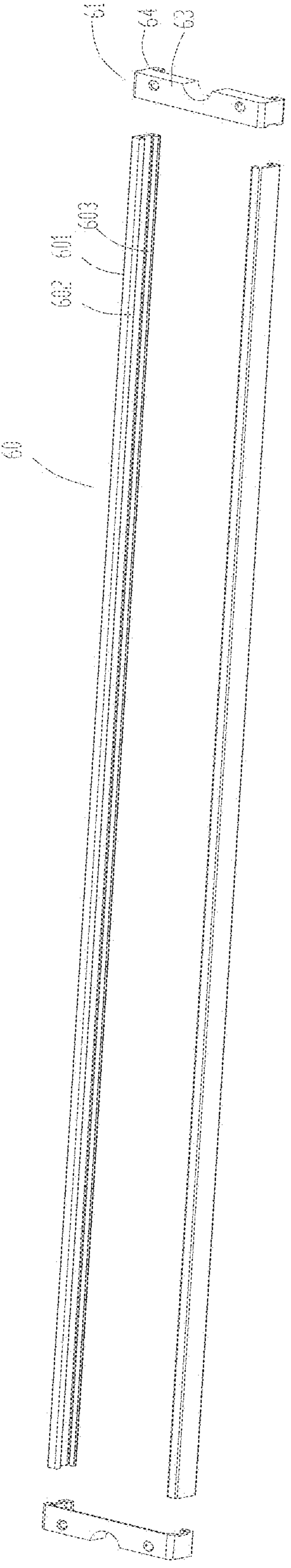
FIG. 6 is a schematic view of an embodiment of a fastening assembly of the present disclosure.

The fastening assembly 6 of the present disclosure encloses the outer periphery of the thermally conductive substrate 1 and the multi-faceted cover plate 4, securing them tightly together. Specifically, the fastening assembly 6 employs a frame component structure, where frame strips engage with slide rails and grooves on the outer peripheries of the thermally conductive substrate 1 and the multi-faceted cover plate 4 to achieve a limiting press-fit. In a specific example, referring to FIG. 6, the fastening assembly 6 includes a first sliding member 60 and a second sliding member 61. The first sliding member 60 is composed of a strip-like base plate 601 and two slide rails 602, 603 extending from the two long edges of the base plate 601. One slide rail 603 is inserted into a slide groove 18 provided on the sidewall of the thermally conductive substrate 1, while the other slide rail 602 is inserted into a recess or step provided on the side of the multi-faceted cover plate 4 and presses down on the bottom of the recess or step from above. By appropriately setting the width of the strip-like base plate 601, the cooperation of the two slide rails with the corresponding grooves and recesses (or steps) allows a uniform force to be applied to the two long edges of the multi-faceted cover plate 4, thereby pressing the cover plate 4 tightly against the thermally conductive substrate 1. The second sliding member 61 is composed of an elongated pressure plate 63 and two claw portions 64 extending downward from both ends of the pressure plate 63. The elongated pressure plate 63 is provided with screw holes and is fastened to the thermally conductive substrate 1 by screw fasteners.

During the connection and pressing process, the two claw portions 64 are inserted into two slide grooves of the thermally conductive substrate 1, similar to the connection method of the first sliding member's slide rails. By appropriately setting the dimensions of the claw portions 64, the elongated pressure plate presses the short edges of the multi-faceted cover plate 4 against the thermally conductive substrate 1 with a uniform force. Screws are used for positioning during assembly to prevent the second sliding member 61 from slipping or shifting.

Figure 7:
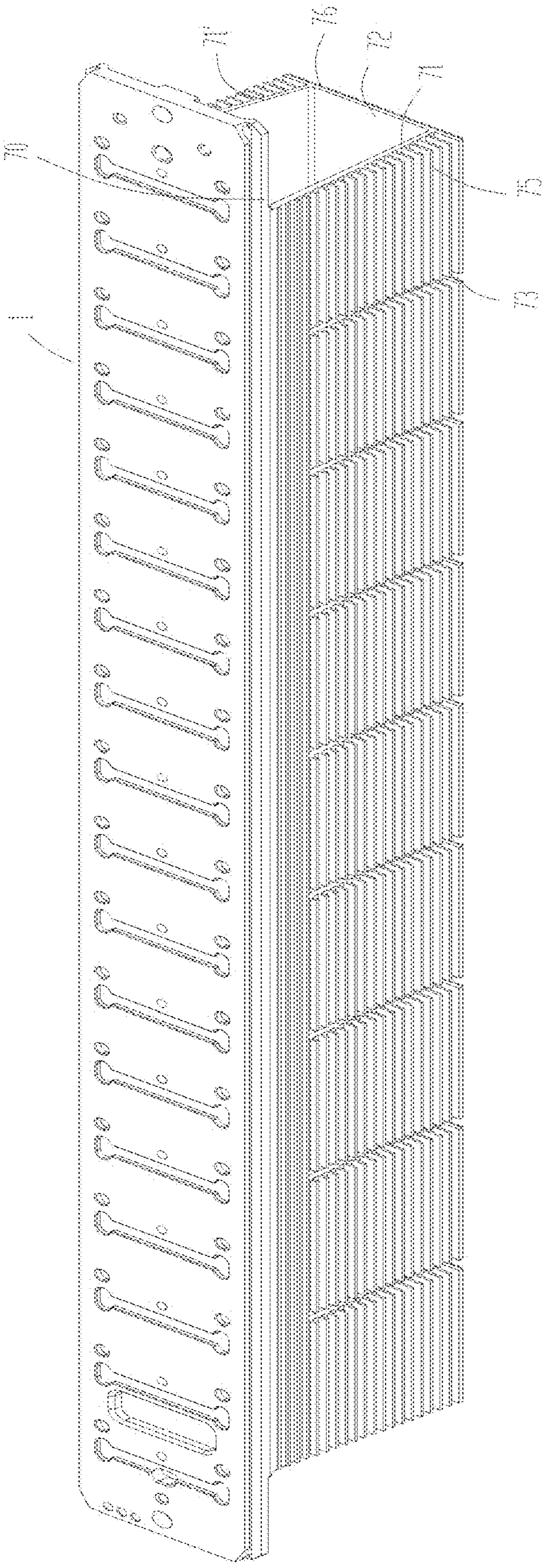
FIG. 7 is a schematic view of an embodiment of a heat sink of the present disclosure.
Figure 8:
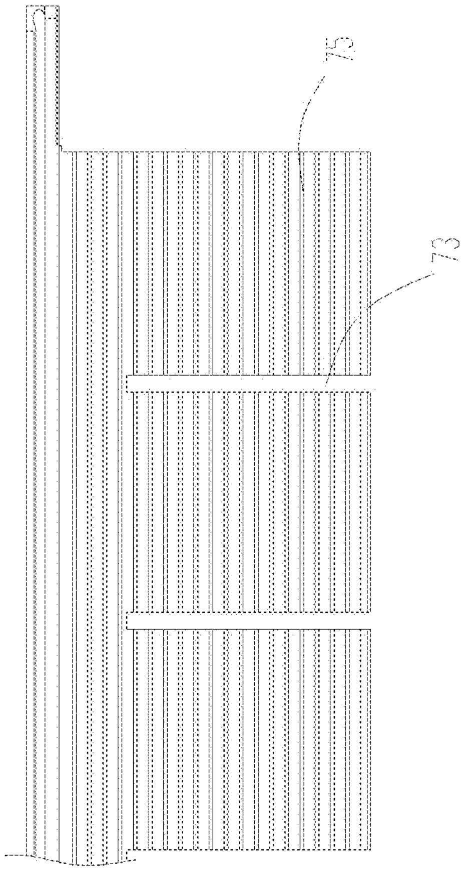
FIG. 8 is a schematic view of an embodiment of a heat dissipation cut-grooves of a heat sink of the present disclosure.

Referring to FIG. 7 and FIG. 8, one embodiment of a heat sink for the integrated tilt-oriented LED light source module is shown. The thermally conductive substrate 1 is a rectangular plate-like structure and constitutes a first heat dissipation plate 70. Two sides of the first heat dissipation plate 70 on the surface opposite the mounting surface extend symmetrically away from the light source module to form two second heat dissipation plates 71, 71'. The ends of the two second heat dissipation plates 71, 71' are connected by a third heat dissipation plate 72, thereby forming a flow channel with a quadrilateral cross-section and openings on two sides. A plurality of heat dissipation cut-grooves 73 are milled from an outer surface of the third heat dissipation plate 72 toward the first heat dissipation plate 70. The heat dissipation cut-grooves 73 extend into the second heat dissipation plates 71, 71' along their extension direction but do not extend to the junction between the second heat dissipation plates 71, 71' and the first heat dissipation plate 70.

In this design, the heat dissipation cut-grooves 73 not only exist on the surface of the third heat dissipation plate but also extend inward into the second heat dissipation plates 71, 71'. Although the cut-grooves 73 penetrate deep into the second heat dissipation plates 71, 71', they do not reach the junction with the first heat dissipation plate 70; that is, the ends of the cut-grooves maintain a certain distance from the junction. The junction between the second heat dissipation plates 71, 71' and the first heat dissipation plate 70 is a mechanically weak point, subject to combined installation and thermal stresses. By terminating the heat dissipation cut-grooves 73 before the junction, the risk of stress concentration caused by grooving in this area is avoided. At the same time, the un-grooved area maintains the continuous cross-section of the second heat dissipation plates, ensuring overall bending stiffness.

The first heat dissipation plate 70 can serve as the plate that directly carries the LED light source module, and its overall planar design ensures the flatness of the light source contact surface. The second heat dissipation plates 71, 71' extend from the two sides of the first heat dissipation plate 70, forming the sidewalls of the quadrilateral flow channel, and their ends are connected by the third heat dissipation plate 72, ultimately forming the flow channel. The heat dissipation cut-grooves 73, formed by a milling process, create multiple segments between the third heat dissipation plate 72 and the second heat dissipation plates 71, 71', forming local thermal bridges perpendicular to the first heat dissipation plate. This shortens the path for heat transfer from the first heat dissipation plate to the third heat dissipation plate, accelerating lateral heat diffusion, increasing the number of airflow channels, and reducing the overall weight of the heat sink. An axis of the heat dissipation cut-grooves 73 forms an angle of 60° to 90° with the plane of the first heat dissipation plate 70. The axis of the cut-grooves 73 is inclined or perpendicular to the first heat dissipation plate 70, for example, at an angle of 85°±5°, which forms an inclined guide surface and increases the speed of natural convection airflow.

Based on the fundamental principle of enhancing heat dissipation efficiency by providing heat dissipation cut-grooves, the cut-grooves can be configured in various forms according to practical needs. In some examples, the heat dissipation cut-grooves 73 are straight grooves, wavy-line grooves, or zigzag-line grooves. They can be further specified, for instance, as wavy-line grooves with a wavelength of 3-8 mm or zigzag-line grooves with a bend angle of 100°-130°.

To balance heat dissipation area and structural strength through parameter constraints, the width of the heat dissipation cut-grooves 73 is 0.5-2 cm, and the spacing between adjacent cut-grooves 73 is 5-10 cm. The extension length of the heat dissipation cut-grooves 73 along the length of the second heat dissipation plates 71, 71' is ½ to ⅚ of the total length of the second plates 71, 71'. The ends of the second heat dissipation plates 71, 71' at the location of the cut-grooves have a certain length, which can prevent stress concentration at the ends of the cut-grooves and extend the service life.

In the embodiments, the quadrilateral cross-section can be any regular or irregular quadrilateral. In a preferred embodiment of the utility model, the quadrilateral cross-section is an isosceles trapezoid, where the two second heat dissipation plates 71, 71' are the legs of the trapezoid, and the third heat dissipation plate 72 is the shorter base. The heat dissipation cut-grooves 73 are straight grooves that traverse the third heat dissipation plate 72 in the cross-sectional direction and partially cut into the second heat dissipation plates 71, 71', with the extension direction of the straight grooves being perpendicular to the plane of the first heat dissipation plate 70.

Figure 9:
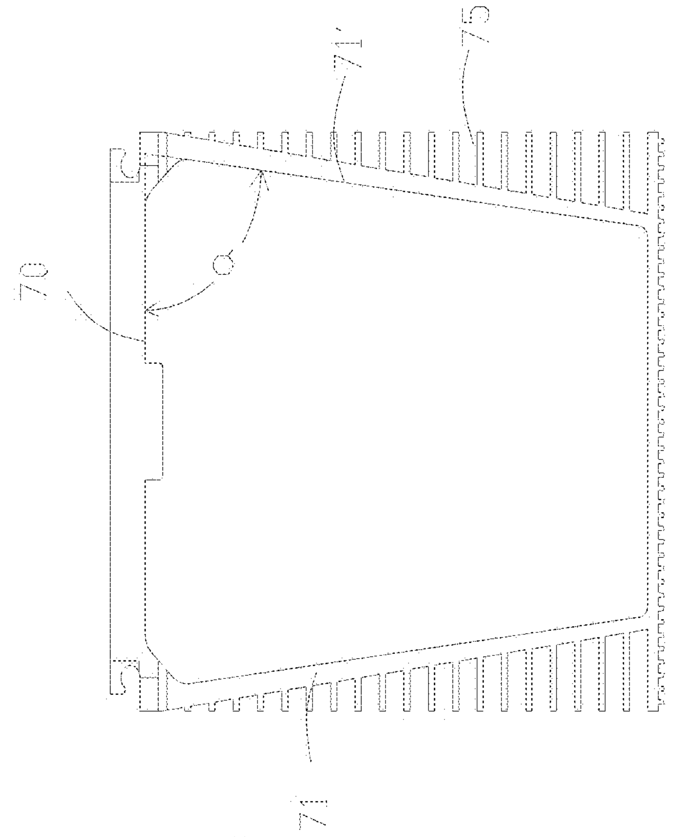
FIG. 9 is a schematic view of an embodiment of a heat dissipation fin of a heat sink of the present disclosure.

Referring to FIG. 9, on an outer surface of each of the two second heat dissipation plates 71, 71', a number of strip-like heat dissipation fins 75 are arranged in sequence, parallel to the junction edge of the second heat dissipation plate 71, 71' and the first heat dissipation plate 70, in a direction from an end near the first heat dissipation plate 70 to an end far from the first heat dissipation plate 70. The height of each of the plurality of heat dissipation fins 75 gradually increases along the arrangement sequence from the end near the first heat dissipation plate 70 to the end far from it. This gradual increase in height means that the farther the fin is from the first heat dissipation plate 70, the taller it is. At the near end with lower fins, the low fins reduce flow resistance when the airflow speed is low; at the far end with higher fins, the taller fins can still maintain effective convective heat transfer after the airflow has accelerated.

The angle of inclination between the side of the second heat dissipation plates 71, 71' and the plane of the first heat dissipation plate 70 is a. The height increment between adjacent heat dissipation fins 75 is equal to the decrease in height of the second heat dissipation plates 71, 71' over the same horizontal distance due to the inclination angle $\alpha$, such that a line connecting the tops of all the heat dissipation fins 75 forms a vertical extension plane that is perpendicular to the plane of the first heat dissipation plate 70. The two vertical extension planes, the plane of the first heat dissipation plate 70, and the outer surface of the third heat dissipation plate 72 together form a flow channel with a rectangular cross-section. The arrangement rule for the heat dissipation fins 75 is that the height difference (increment) between adjacent fins is equal to the decrease in height of the second heat dissipation plates 71, 71' due to the inclination angle, causing the line connecting the tops of all fins to form a vertical plane. This forms a heat sink with a rectangular solid structure, ensuring an aesthetic appearance and facilitating the arrangement and installation of multiple light source modules, while the large surface area of the heat dissipation fins 75 undoubtedly enhances heat dissipation significantly.

The third heat dissipation plate 72 is provided with a plurality of parallelly arranged second heat dissipation fins 76, which are perpendicular to the heat dissipation cut-grooves 73. The height of the second heat dissipation fins 76 is 1-3 mm.

In the above design, the heat sink forms a heat dissipation network through the flow channel, cut-grooves, and fins of gradually varying thickness, effectively solving the heat dissipation problem under the high heat density of the LED module.

Based on the technical solution described above, the installation steps for the integrated tilt-oriented LED light source module of the present disclosure include:

(1) Arranging the prefabricated tilted mounting platforms (wedge blocks) in a preset direction in parallel on the mounting reference surface of the thermally conductive substrate and fastening them with countersunk screws.

(2) Placing the aluminum substrate onto the inclined surface of the tilted mounting platform, ensuring the recess on the high-side edge is aligned, and fixing both ends of the aluminum substrate to the tilted mounting platform with screws, avoiding the recess area.

(3) Unfolding the strip-like flexible printed circuit along the arrangement direction of the mounting platforms, inserting the bent portions into the recesses of the aluminum substrates, and pressing the circuit board onto the surface of the aluminum substrates with conductive adhesive to form a conductive path.

(4) Introducing the power line through the wire-through hole of the thermally conductive substrate, routing it concealed along the arc-shaped groove and recess to the receiving groove, and welding the terminal and TVS diode to ensure electrical continuity.

(5) Aligning the inner surface of the cover plate with the profile of the thermally conductive substrate and aluminum substrates and pressing it lightly to fit. Locking the cover plate to the thermally conductive substrate using the slide rail and pressure plate components, ensuring that each lens is precisely aligned with the corresponding light-emitting device.

Figure 10:
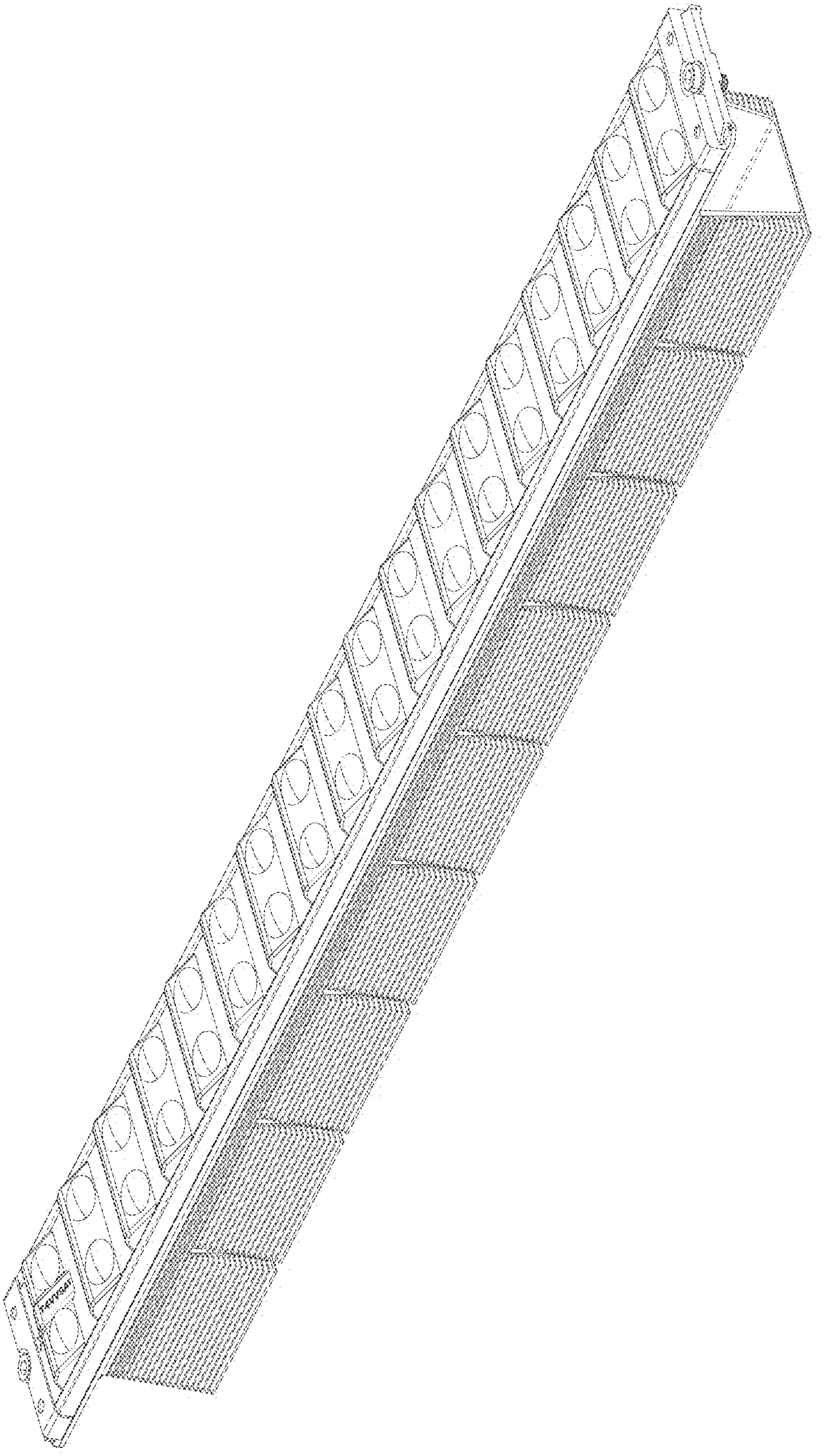
FIG. 10 is an overall structural schematic view of a first embodiment of the integrated tilt-oriented LED light source module of the present disclosure.
Figure 11:
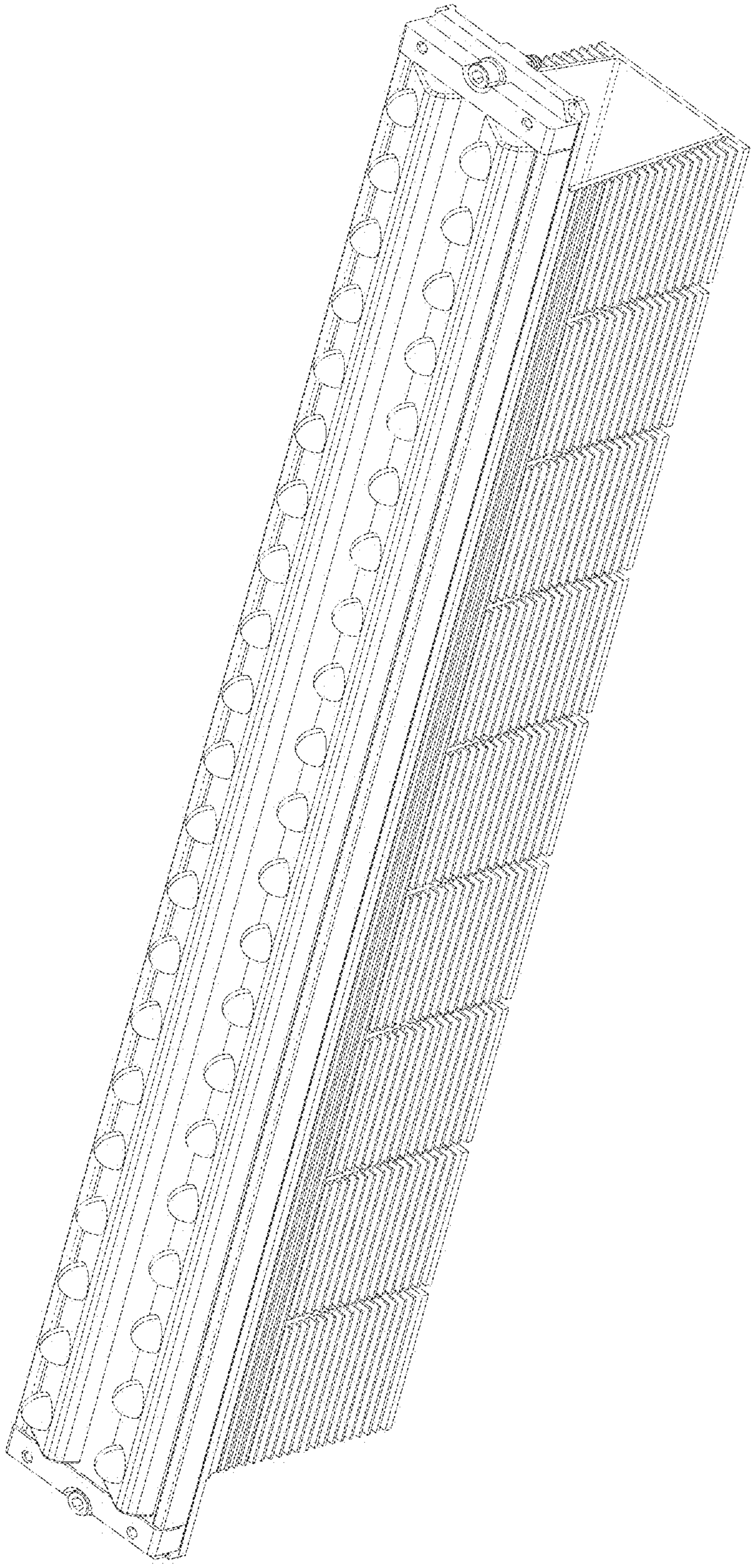
FIG. 11 is an overall structural schematic view of a second embodiment of the integrated tilt-oriented LED light source module of the present disclosure.
Figure 12:
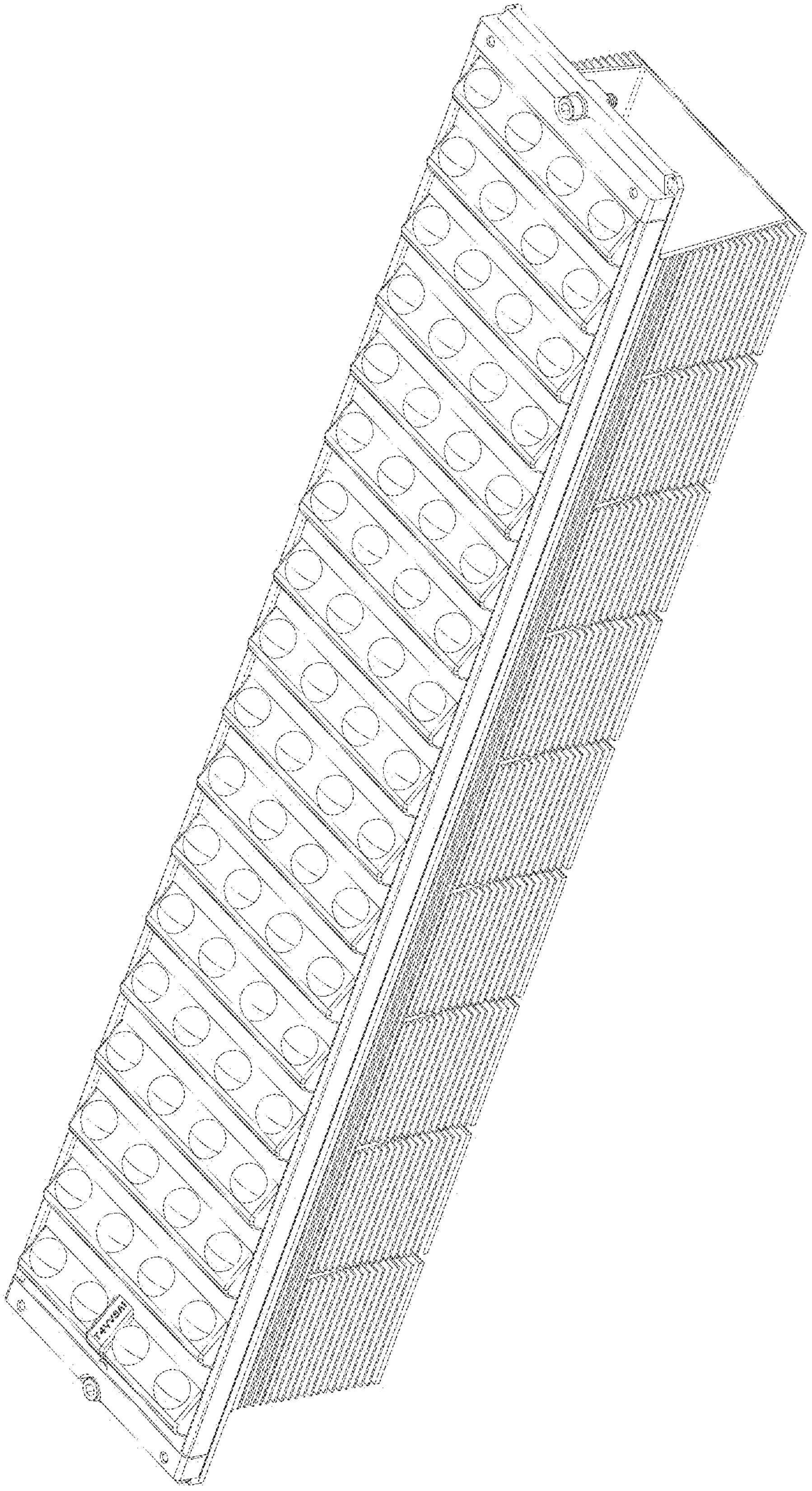
FIG. 12 is an overall structural schematic view of a third embodiment of the integrated tilt-oriented LED light source module of the present disclosure.

Through the technical solution of the present invention and its modular assembly design, various light source modules with preset tilt angles can be rapidly adapted to actual application scenarios (such as road lighting, landscape illumination, sports venues, etc.). By adjusting the tilt angles of the tilted mounting platforms and the number of light-emitting devices thereon, different tilt configurations, as shown in FIGS. 10-12, can be selected to precisely match the illumination requirements of different areas.

The various embodiments in this specification are described progressively. The parts that are the same or similar among the embodiments may be cross-referenced to one another. Each embodiment emphasizes the differences from other embodiments. Especially for device embodiments, since they are generally similar to method embodiments, their description is relatively simplified, and relevant content can be referred to in the corresponding method embodiments.

The foregoing description is only intended to illustrate specific embodiments of the present invention, and the protection scope of the present invention is not limited thereto. Any modifications or substitutions that can be easily conceived by those skilled in the art within the technical scope disclosed by the present invention shall fall within the protection scope of the present invention. Therefore, the protection scope of the present invention shall be defined by the appended claims.

The invention claimed is:

1. An integrated tilt-oriented LED light source module, comprising:

- a thermally conductive substrate having a mounting reference surface, wherein a plurality of tilted mounting platforms are arranged in parallel on the mounting reference surface, and a mounting surface of each tilted mounting platform forms a preset tilt angle with the mounting reference surface, and the mounting surfaces of the tilted mounting platforms have a same tilt direction with a same tilt angle value;
- a substrate assembly, comprising a plurality of aluminum substrates and a flexible conductive connector, wherein each of the aluminum substrates is fixed to the mounting surface of a corresponding one of the tilted mounting platforms, and the flexible conductive connector bridges adjacent ones of the plurality of aluminum substrates to form a conductive path;
- a light source assembly, comprising a plurality of light-emitting devices mounted on the plurality of aluminum substrates;
- a multi-faceted cover plate, having an inner surface profile that conforms to an outer peripheral profile of the thermally conductive substrate and the substrate assembly in an assembled state thereof, wherein a lens is formed corresponding to a light-emitting surface of each light-emitting device; and
- a fastening assembly, enclosing an outer periphery of the thermally conductive substrate and the multi-faceted cover plate and securing the thermally conductive substrate and the multi-faceted cover plate together.

2. The LED light source module of claim 1, wherein the plurality of tilted mounting platforms are wedge-shaped block structures arranged in parallel along a length direction, a width direction, or a diagonal direction of the mounting reference surface, wherein an inclined face of each wedge-shaped block structure constitutes the mounting surface; and the light-emitting devices are arranged in a matrix array on each of the aluminum substrates, and the flexible conductive connector is positioned to avoid the plurality of light-emitting devices.

3. The LED light source module of claim 1, wherein the plurality of tilted mounting platforms are integrally cast on the mounting reference surface.

4. The LED light source module of claim 1, wherein the mounting reference surface of the thermally conductive substrate is provided with a connection screw hole;

- the tilted mounting platform is a separate body having a countersunk hole at a center of its surface and a coaxial threaded hole below the countersunk hole, and the connection screw hole and the threaded hole are engaged by a countersunk fastening screw with a head of the screw fully seated within the countersunk hole; and
- the mounting reference surface of the thermally conductive substrate is provided with a limiting groove, and a bottom of the tilted mounting platform is provided with a limiting block configured to mate with the limiting groove.

5. The LED light source module of claim 1, wherein the flexible conductive connector is a strip-like flexible printed circuit, the flexible printed circuit extends along an arrangement direction of the plurality of tilted mounting platforms and is integrally formed with a plurality of independent bent portions;

- a bending angle of each of the independent bent portions matches a tilt angle of the mounting surface of the corresponding tilted mounting platform, and a bending apex of each bent portion is located at a high-side edge of the corresponding tilted mounting platform; and
- the independent bent portions of the flexible printed circuit are laminated onto an upper surface of each of the aluminum substrates with a conductive adhesive to form a continuous surface-contact conductive path covering all of the aluminum substrates.

6. The LED light source module of claim 5, wherein the tilted mounting platforms are arranged in parallel and spaced apart on the mounting reference surface, and a straight section of the flexible printed circuit between adjacent independent bent portions covers the mounting reference surface between adjacent tilted mounting platforms;

- the aluminum substrate fixed to the tilted mounting platform has a recess at its high-side edge to accommodate the bending apex of the corresponding independent bent portion; and
- the aluminum substrate is fastened to the mounting surface of the tilted mounting platform at two ends of its body by screw fasteners, wherein installation positions of the screw fasteners avoid the recess and the flexible printed circuit.

7. The LED light source module of claim 6, wherein the tilted mounting platforms includes an outermost tilted mounting platform located at one end of the mounting reference surface, and a mounting surface of the outermost tilted mounting platform faces an inner side of the mounting reference surface;

- the thermally conductive substrate is provided with a wire-through hole on a side outward of the outermost tilted mounting platform and a receiving groove on a surface inward of the outermost tilted mounting platform;

the aluminum substrate fixed to the outermost tilted mounting platform has an extension portion extending from a low-side of its inclined face toward the receiving groove;

a high-side edge of the outermost tilted mounting platform is provided with an arc-shaped groove connected to the recess of the aluminum substrate, wherein an input line passes through the wire-through hole, is covered by an insulating sleeve, and is bent to pass through the arc-shaped groove and the recess, extending along the inclined face of the aluminum substrate to the receiving groove area; and an end of the input line is connected to a terminal and a TVS diode in sequence, wherein the TVS diode is welded to an upper surface of the extension portion of the aluminum substrate and is electrically connected to the aluminum substrate.

8. The LED light source module of claim 1, wherein the multi-faceted cover plate is an integrally injection-molded structure, comprising:

a main cover body, covering the outer peripheral profile of the thermally conductive substrate and the substrate assembly in the assembled state;

a plurality of protrusions, integrally formed on the main cover body along an arrangement direction of the tilted mounting platforms, wherein a shape of each of the plurality of protrusions is adapted to a combined outer peripheral profile of the corresponding tilted mounting platform and aluminum substrate, and wherein a profile of each protrusion at a high-side of the corresponding tilted mounting platform has an arc-shaped transition structure; and a plurality of the lenses, wherein each lens corresponds to a position of one of the light-emitting devices and is integrally formed on the corresponding protrusion, such that the light-emitting surface of each light-emitting device faces a center of one lens.

9. The LED light source module of claim 1, wherein the thermally conductive substrate is a rectangular plate-like structure and constitutes a first heat dissipation plate, two sides of the first heat dissipation plate on a surface opposite the mounting reference surface extend symmetrically away from the module to form two second heat dissipation plates, and ends of the two second heat dissipation plates are connected by a third heat dissipation plate, thereby forming a flow channel with a quadrilateral cross-section and openings on two sides; and a plurality of heat dissipation cut-grooves are milled from an outer surface of the third heat dissipation plate toward the first heat dissipation plate, wherein the heat dissipation cut-grooves extend into the two second heat dissipation plates along their extension direction but do not extend to a junction between the second heat dissipation plates and the first heat dissipation plate.

10. The LED light source module of claim 9, wherein the quadrilateral cross-section is an isosceles trapezoid, the two second heat dissipation plates are two legs of the isosceles trapezoid, and the third heat dissipation plate is a shorter base of the isosceles trapezoid, and the heat dissipation cut-grooves are straight grooves that traverse the third heat dissipation plate and partially cut into the second heat dissipation plates, and an extension direction of the straight grooves is perpendicular to a plane of the first heat dissipation plate; and on an outer surface of each of the two second heat dissipation plates, a plurality of strip-like heat dissipation fins are arranged in sequence, parallel to a junction edge of the second heat dissipation plate and the first heat dissipation plate, in a direction from an end near the first heat dissipation plate to an end far from the first heat dissipation plate; wherein a height of each of the plurality of heat dissipation fins gradually increases along the arrangement sequence.

* * * * *